April 7, 1953
L. H. BIGGAR
2,633,993
CLARIFYING FILTER
Filed April 18, 1950
3 Sheets-Sheet 1
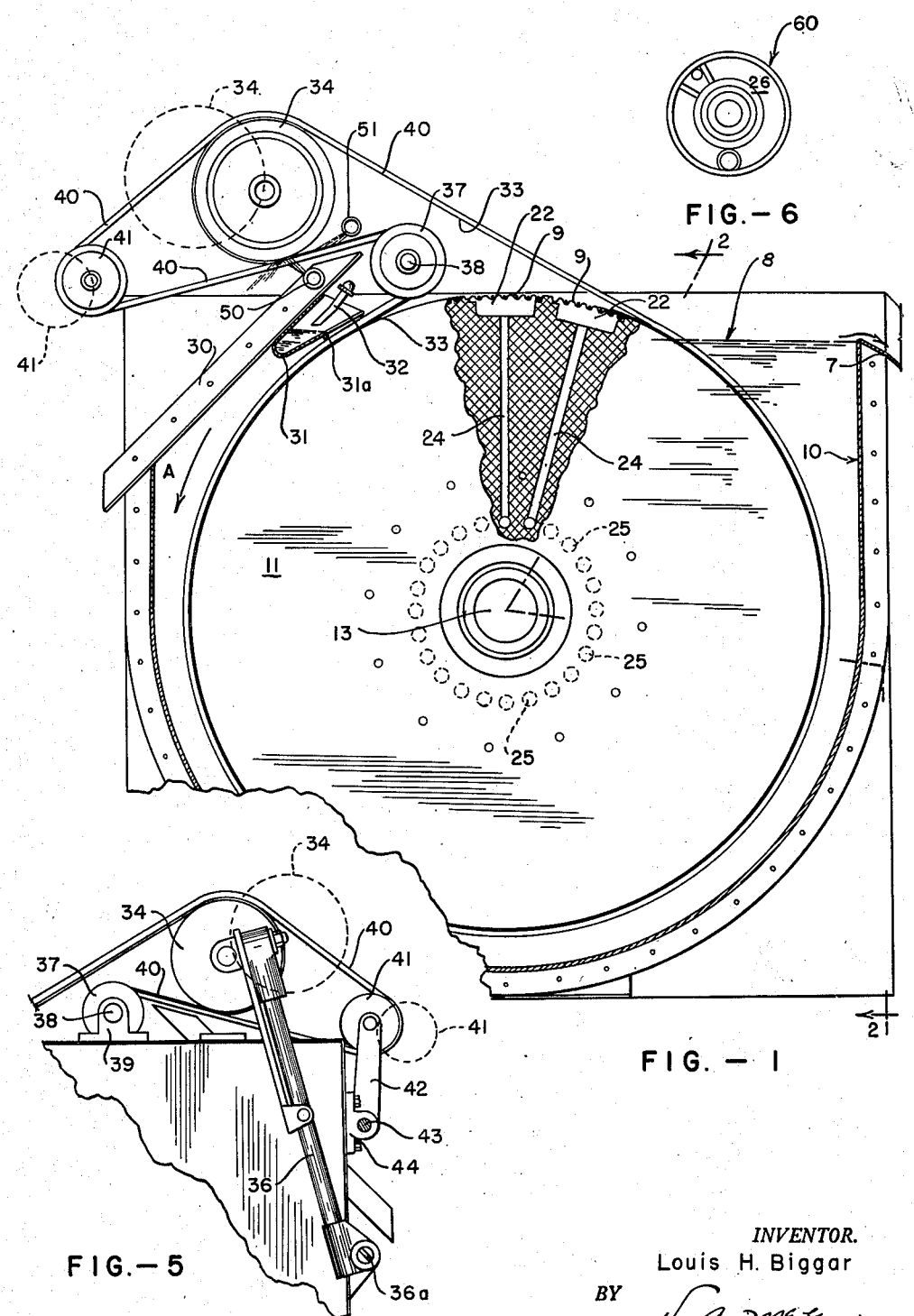
FIG.—6
FIG.—1
FIG.—5
*INVENTOR.*
Louis H. Biggar
BY
ATTORNEY

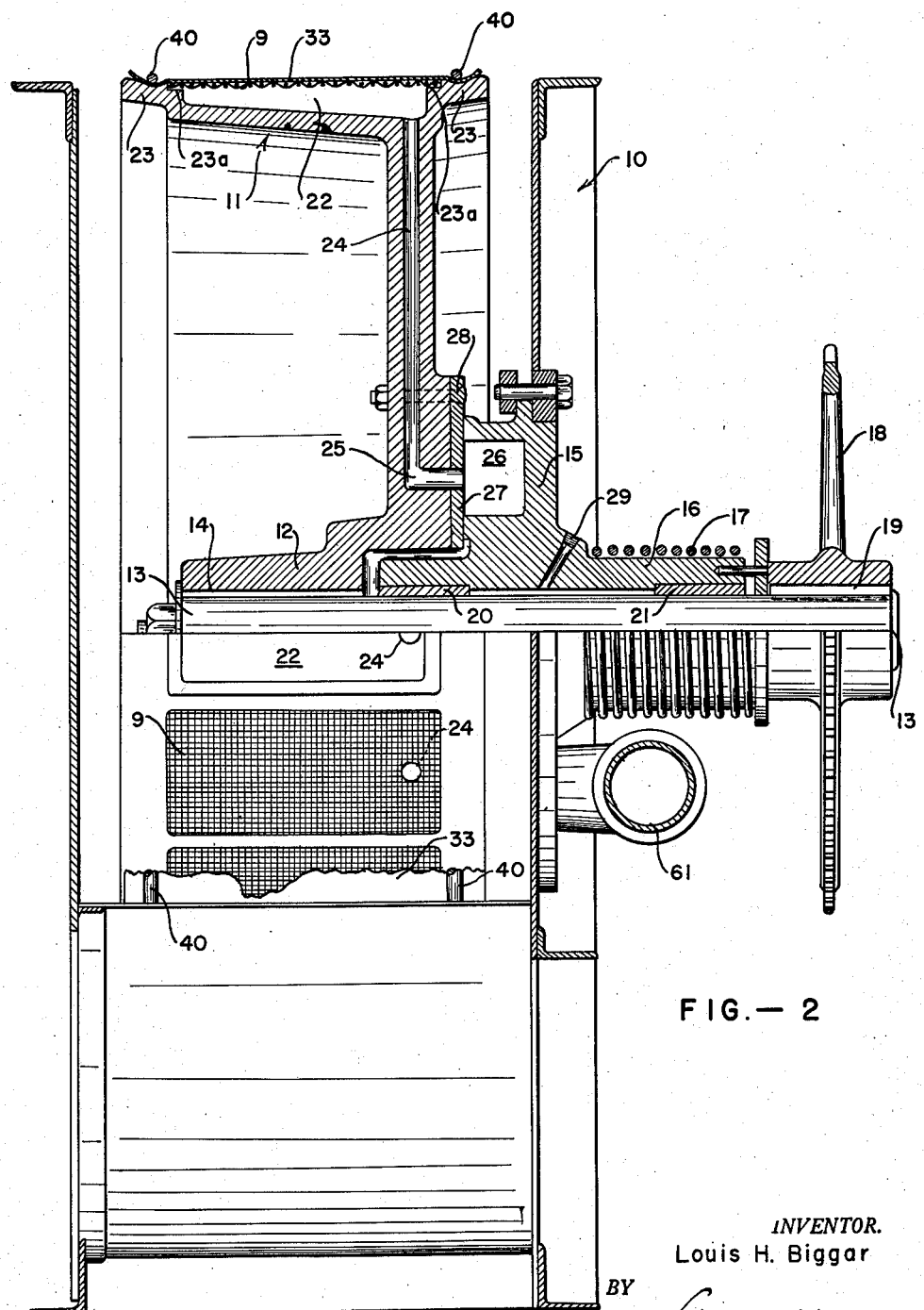
FIG.— 2
INVENTOR.
Louis H. Biggar

April 7, 1953 L. H. BIGGAR 2,633,993
CLARIFYING FILTER
Filed April 18, 1950 3 Sheets-Sheet 3
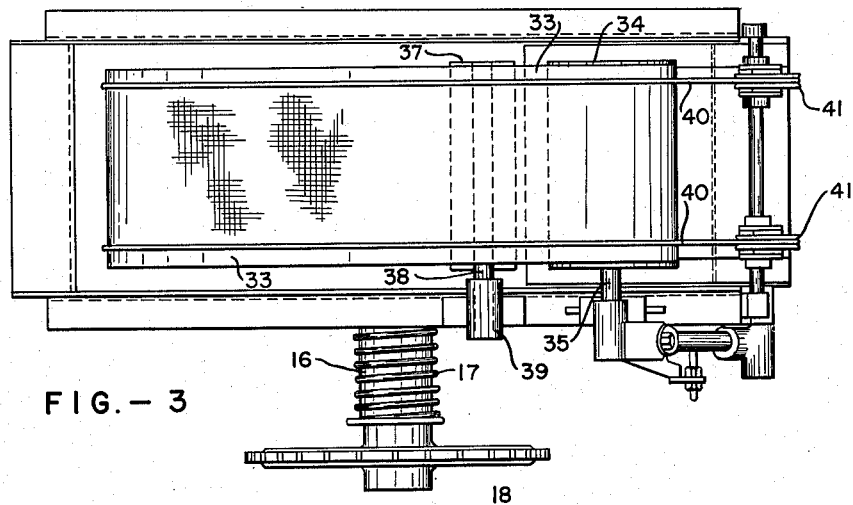
FIG.—3
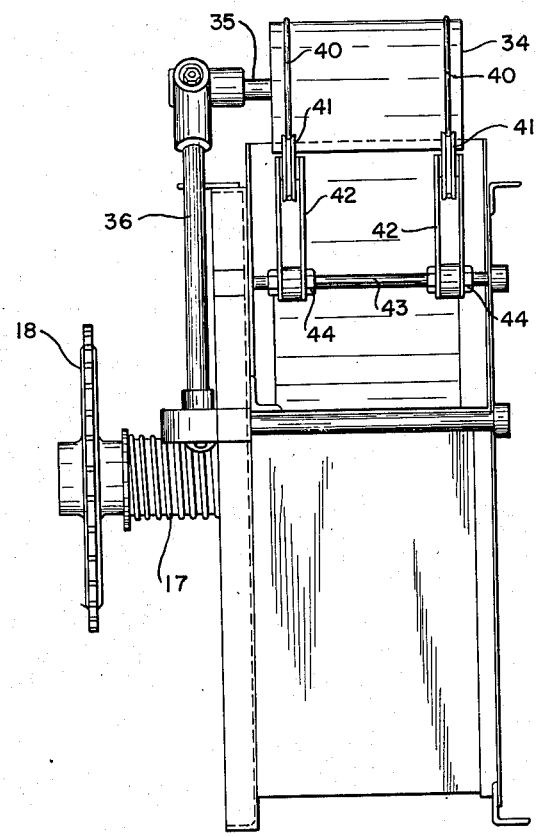
FIG.—4
INVENTOR.
Louis H. Biggar
BY
ATTORNEY Patented Apr. 7, 1953

2,633,993

UNITED STATES PATENT OFFICE 2,633,993

CLARIFYING FILTER

Louis H. Biggar, Kittredge, Colo., assignor to Biggar and Associates, Inc., Denver, Colo., a corporation of Colorado Application April 18, 1950, Serial No. 156,706

6 Claims. (Cl. 210—198)

The present invention relates to a clarifying filter and more particularly to a rotary vacuum clarifying filter preferably of the endless filter band type.

The filter of the present invention is intended particularly, although not exclusively, for use in separating fine foreign particles from otherwise clean sugar juice, or similar liquids.

One of the objects of the present invention is to provide an improved rotary vacuum type clarifying filter whose filter media is preferably an endless filter band of specially impregnated fabric and whose rotary drum over which the band travels is nearly completely immersed in the liquid of the filter tank or casing.

Another object of the present invention is to provide an improved filter of the foregoing character in which the endless filter band of impregnated fabric is mechanically unattached to the filter drum but which is held in intimate contact with the drum periphery by means of endless belts which resiliently engage the side edge portions of the endless filter band.

A further objects of the present invention is to provide a filter of the foregoing character wherein the endless filter band of impregnated fabric is looped at a point outside the filter tank or casing, is cleaned at that point, and is held under tension whereby to maintain the endless band taut at all times.

Another object of the present invention is to provide an improved rotary type vacuum filter having a drum which is substantially wholly submerged in the liquid of the filter tank, which has an endless filter band formed from impregnated fabric which travels over the drum and which is looped over a takeup roller located externally of the tank, and which has a pair of spaced endless belts in contact with the opposite edge portions of the filter band, in which the belts are also looped exteriorly of the tank and are engaged with takeup members located adjacent to but beyond the takeup means for the endless filter band, to maintain the belts under tension and to thus hold the endless band in intimate contact with the filter drum periphery.

A further object of the present invention is to provide an improved filter of the foregoing type in which filter band cleaning apparatus is associated with the looped portion of the band disposed exteriorly of the filter tank, and in which means is provided in the vicinity of the cleaning apparatus but separated therefrom for providing a filter aid liquid to the endless filter band at a point located between the band cleaning apparatus and the periphery of the filter drum where the filter band again enters the liquid in the filter tank.

Another object of the present invention is to provide an improved rotary type filter having an endless band formed from improved filtering material capable of producing a more efficient clarification than previously known filters.

Another object of the present invention is to provide an improved rotary drum type filter as aforesaid employing as the filtering means, an endless filter band of impregnated fabric subjected for a considerable period of its submergence to vacuum or suction but not subjected at any time to blowing; a further object being to provide suitable cleaning apparatus and means for the impregnated fabric filter band which will not damage said band while it is being cleaned during its travel out of contact with the liquid of the filter tank; it being a still further object of the present invention to provide an improved filter which entirely eliminates the need for mechanical cleaning devices for cleaning the endless filter band, and which substantially reduces the quantity of filter aid material required in clarifying treatments.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is a back elevational view of the filter of the present invention with the tank side removed, partly in section and partly broken away.

Fig. 2 is an enlarged sectional view of the structure of Fig. 1 and taken substantially along the irregular section line 2—2 of Fig. 1, looking in the direction of the arrows.

Fig. 3 is a top plan view of the filter of the preceding views.

Fig. 4 is an end elevational view of the filter of Fig. 3, looking toward the right side of that figure.

Fig. 5 is a fragmentary side elevational view showing the takeup or tensioning mechanism for the endless filter band and the endless band-maintaining belts shown in Fig. 1; and Fig. 6 is a face view of the valve cover of the filter structure.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to the drawings and especially to Figs. 1 and 2 thereof, the improved filter structure of the present invention comprises a filter tank or casing, shown as a whole at 10 within which is disposed a rotatable filter drum, indicated as a whole at 11. The drum 11 has a hub 12 mounted upon a driven shaft 13 and preferably non-rotatively attached thereto by a key 14. Shaft 13 extends outwardly through a wall of tank 10 and through the valve cover portion 15 of the filter. Valve cover portion 15 includes a stationary or fixed hub 16 which is urged toward the drum hub portion 12 by a coiled spring 17. The portions 15 and 16 are non-rotatable. The outer end of shaft 13 extends beyond the hub portion 16 and carries a sprocket 18 which is secured to the shaft so as to rotate therewith by a suitable key 19. A suitable sprocket chain (not shown) connects sprocket 18 with suitable driving mechanism (not shown) provided for the purpose of driving shaft 13 and the filter drum 11. Suitable bearings 20 and 21 are interposed between the hub portions 15 and 16 and shaft 13, as may be seen in Fig. 2.

The rotatable drum 11 of the present filter is preferably formed with a series or plurality of spaced peripheral sections or pockets 22 which, as shown, are rectangular or oblong and whose ends terminate short of the side edges 23 of the drum periphery. Each of the sections or pockets 22 is preferably provided with a wire mesh member or frame 9 whose edges fit in peripheral grooves 23a which surround or frame each of the pockets. Each pocket or section 22 is also connected by a duct or passageway 24 and a lateral port 25 with the chamber 26 in valve cover 15.

The drum 11 carries an annular wear seat or plate member 27 which is preferably attached to the web of the drum by a series of bolts 28, one only being seen in Fig. 2. Grease or some similar lubricant may be supplied to bearings 20 and 21 through a standard fitting or the like, indicated generally at 29 in Fig. 2.

As seen in Fig. 1, the liquid level in tank 10 is indicated at 8, with the overflow for the tank being shown at 7.

At the opposite side from overflow 7, the tank 10 is provided with a downwardly and outwardly inclined sludge discharge chute 30 which carries on its under side a trough-like member 31 which is supplied with a filter aid liquid by a supply pipe 32 leading to a source of supply (not shown). The trough-like member 31 has a lip 31a over which the filter aid liquid flows and contacts the impregnated fabric filter band just prior to its submergence, as will be hereinafter described.

The filter media of the present invention is preferably in the form of an endless filter band 33. This band is preferably formed from some suitable impregnated fabric, such as cotton or rayon fibrous material, which preferably is impregnated with a predetermined quantity of diatomaceous earth, which is substantially less than when used as a conventional filter aid material. In fact, the filter media employed in connection with the present filter is preferably like that embodied in my copending application, Serial No. 32,980 filed June 14, 1948.

The endless filter band 33 is engaged with the periphery of drum 11 and overlies and contacts the series of screen frames or sections 9 which cover the peripheral pockets 22 of the drum. The filter band 33 is preferably substantially the same width as the peripheral portion of drum 11. At least it is of sufficient width to overlie the screen frames 9 and the flanges or side edge portions 23. As seen in Fig. 1, the endless filter band 33 covers approximately the entire peripheral portion of drum 11, with the exception of approximately two or three of the wire frames 9 over a like number of pockets 22 and extends out of the open upper end of tank 10 and is looped about an idler drum or cylinder 34 mounted on a shaft 35 and carried by an upright arm 36 extending from the framework of the machine. The endless filter band 33 also extends over a somewhat smaller roller or cylinder 37 rotatably mounted upon a shaft 38 journalled in a bearing 39 on the framework of the tank. The drum or cylinder 34 provides not only an idler drum for the driven filter band 33 but also takeup means for the band so as to tighten or loosen the band around the filter drum periphery, as desired. Any suitable means may be provided for adjusting the idler 34, such as having the lower end of supporting arm 36 mounted upon a bracket of the framework by means of an adjustment screw or bolt, such as that shown at 36a in Fig. 5. It will be understood that by loosening the bolt 36a, supporting arm 36, shaft 35 and idler cylinder 34 may be shifted from the full line position shown in Figs. 1 and 5 to the broken line position of cylinder 34, as shown in these figures.

By operating the takeup device 34, the endless filter band 33 may be tightened sufficiently around the periphery of drum 11 so that when the drum is driven by sprocket 18, the band will be driven properly and travel over its idlers 34 and 37. It is, however, desirable to maintain the filter band, especially the side edge portions thereof, in intimate contact at all times with the drum peripheral portions 23 so that no liquid can pass into the drum and the ducts and ports thereof without having passed through the filter media. For this purpose, and in accordance with the present invention, I have provided two separate endless belts 40 which may be of round cross section and which are preferably formed from rubber, synthetic rubber, rubber composition, or some other suitable durable and elastic material. These belts 40 are endless and pass around the peripheral portion of the drum and serve to hold the side edge portions of filter band 33 in intimate contact with the portions or surfaces 23 of the drum, as best seen in Fig. 2. These belts 40 extend continuously around substantially the entire circumference of the drum and then pass upwardly and outwardly over idler takeup member 34 and beyond the looped portion of filter band 33 on idler 34 and around and in contact with a pair of spaced idler pulleys 41 which are rotatably mounted upon suitable short shafts carried by upright arms 42, see particularly Figs. 4 and 5. The lower end of supporting arms 42 are mounted upon a shaft 43 whose ends are journalled in brackets 44 carried by the framework of the machine. Shaft 43 is preferably provided with means for turning it, such as a slot or notch (not shown) formed in one end thereof to permit the application of a suitable tool to rotate the shaft and thus shift the supporting arms 42 to move, if desired, the idler takeup pulleys 41 from their full line position of Fig. 5 to their broken line position shown in this figure. It will be understood, therefore, that the endless belts 40 may be placed under tension by the adjustment means described so as to bind or hold the endless filter band 33 in intimate contact with the periphery of the filter drum, whereby the highest filtering efficiency may be obtained.

It will be understood that the drum 11 is being rotated in a counter-clockwise direction as indicated by the arrow A in Fig. 1 of the drawings. As the filter media, namely the endless impregnated fabric band 33 issues from the liquid in tank 10 and moves out of contact with the screen sections 9 of the drum, it travels upwardly and over takeup member 34, whereupon the tension-applying belts 40 travel upwardly and over the same takeup device or roller 34 and thence outwardly beyond the member 34 and around the takeup pulleys or disks 41. The filter band 33 is looped short of the loops formed by the belts 40 and passes around takeup roller 34 where it is again engaged by the endless belts 40 at the under side of the periphery of member 34. At this point, and above the sludge discharge chute 30, there is provided a water or other liquid spray pipe 50 disposed beneath the course of the filter band and the tensioning belts to spray water onto the material at the outer surface of the filter band 33 and cause it to drop onto the chute or inclined surface 30. To provide additional means for freeing the filter media band 33 of additional cake or other material, a second spraying device 51 is provided at a point between the idlers 34 and 37 to discharge a spray of water or other liquid onto the inner surface of the filter band 33 and thus force outwardly and downwardly and into the chute 30, any of the remaining foreign particles of cake or other material. Thus, the filter band 33 is completely recleaned prior to its entry and submergence in the liquid within tank 10.

Disposed beneath and preferably attached to the under side of the chute or incline 30, is the filter aid trough-like member 31 previously referred to. This trough-like member 31 has a lip portion 31a disposed above the filter band 33 over which the filter aid liquid fed into the trough from line 32, flows onto the adjacent outer surface of the filter band 33 to precoat it just prior to its entry and submergence into the liquid within the filter tank 10. Thus, the endless filter media 33 is thoroughly cleansed and can be precoated with filter aid prior to each of its trips or passages through the liquid in the tank.

In Fig. 6 there is shown the valve cover which is indicated as a whole at 60 and which is shown as removed in Fig. 1 but in its applied position in Fig. 2. This valve cover is provided with chambers, such as chamber 26, see also Fig. 2, which cooperates with the ports and connecting ducts of the drum structure so as to apply, to all submerged portions of the filter band 33, suction to create vacuum in the line to draw the liquid to be filtered through the filter media to be discharged through outlet pipe 61, see Fig. 2. As the successive duct 24 and cooperating port 25 are submerged in the liquid of tank 10, suction immediately occurs to create vacuum in those passageways to draw the liquid in the tank thereinto and through the filter media and into chamber 26, from which the filtered liquid passes out of the filter through the outlet pipe or port 61. As each of the successive ducts 24 emerges from the liquid in the tank 10 at the upper portion of the revolution of the drum, the vacuum is immediately broken, this being due to the arrangement of adjustable chambers formed in the valve cover of Fig. 6, as is well known in this art and need not be further described herein. The filter band portions as they leave the drum periphery carry the sludge in so-called free or released condition upwardly and over idler 34, where said cake is subjected to oppositely disposed streams of water or other liquid to completely free the sludge from the filter media and allow it to be discharged onto chute or incline 30.

While the filter of the present invention has been designed especially for use in connection with sugar juice, it has a wide range of uses with various other liquids which it is desirable to clarify.

It is to be noted that the present clarifying filter structure does not employ any blowing step in conjunction with the use of vacuum or suction. Moreover, it is to be noted that no mechanical means, such as rotary beaters, brushes, or the like are employed for cleaning the filter media or band 33. This band 33 is subjected to vacuum or suction while performing its filtering action and is then cleansed of sludge and other foreign substance by the expedient of the gentle treatment on opposite sides by sprays of water or other cleansing liquid. Therefore, the impregnated fabric filter band, which may be formed from the impregnated material of my aforementioned co-pending application, has an extremely long life, thus materially reducing the cost of operation as compared with that of other presently known filters.

I claim:

1. In a vacuum filter, the combination with a tank, a rotatable drum disposed therein and whose greater diameter is only slightly less than the depth of said tank whereby a major portion thereof is submerged in the solution in said tank, said drum having peripheral screen sections, an endless filter band of impregnated media travelling over said drum and supported by said screen sections, means for rotating the drum, roller means outside the tank over which said endless band travels, and a pair of widely spaced belts formed from elastic material engaging said endless band adjacent its side edges travelling with the band and engaging idlers disposed adjacent said roller means for maintaining the side edges of the band taut and in intimate contact with the drum periphery at the side edges thereof.

2. A vacuum filter according to claim 1, wherein said roller means and idlers are independently adjustable to take up slack in said endless filter band and said spaced belts.

3. A vacuum filter according to claim 1, wherein spray nozzles are disposed on opposite sides of the course of said endless filter band in the vicinity of the roller means for spraying water onto the band for removing sludge therefrom, and wherein a sludge discharge chute is disposed below said nozzles.

4. A vacuum filter according to claim 1, wherein spray nozzles are disposed on opposite sides of the course of said endless filter band in the vicinity of the roller means for spraying water onto the band for removing sludge therefrom, wherein a sludge discharge chute is disposed below said nozzles, and wherein a trough having a lip is provided within the casing adjacent the periphery of the drum and below said discharge chute for pouring filter aid substance onto the endless filter band after the same passes beyond the spray nozzles.

5. A vacuum filter according to claim 1, wherein suction means is provided for drawing solution through the endless filter band during a part of each revolution of the drum.

6. A vacuum filter according to claim 1, wherein the filter includes a valve assembly, wherein the drum has a web portion which together with said valve assembly includes suction means for drawing solution through the endless filter band during a portion of each revolution of the drum, and wherein said suction means includes a plurality of ducts and cooperating ports formed in said web portion and also includes said valve assembly registrable with said ports for controlling the period of application of suction to the drum periphery and filter band.

LOUIS H. BIGGAR.

REFERENCES CITED

The following references are of record in the file of this patent:

UNITED STATES PATENTS

| Number | Name | Date |
|---|---|---|
| 2,145,933 | Kehrer | Feb. 7, 1939 |
| 2,426,886 | Komline | Sept. 2, 1947 |
| 2,443,986 | Little | June 22, 1948 |